United States Patent
Hayashi et al.

(10) Patent No.: US 9,523,442 B2
(45) Date of Patent: Dec. 20, 2016

(54) DOUBLE SOLENOID VALVE WITH DETENT MECHANISM

(71) Applicant: SMC Corporation, Chiyoda-ku (JP)

(72) Inventors: Bunya Hayashi, Tsukuba (JP); Kenichi Matsumura, Kashiwa (JP)

(73) Assignee: SMC CORPORATION, Chiyoda-ku (JP)

( * ) Notice: Subject to any disclaimer, the term of this patent is extended or adjusted under 35 U.S.C. 154(b) by 100 days.

(21) Appl. No.: 14/337,359

(22) Filed: Jul. 22, 2014

(65) Prior Publication Data
US 2015/0059898 A1    Mar. 5, 2015

(30) Foreign Application Priority Data
Aug. 29, 2013 (JP) .................................. 2013-178519

(51) Int. Cl.
  *F15B 13/043*    (2006.01)
  *F16K 31/42*     (2006.01)
  *F16K 11/07*     (2006.01)

(52) U.S. Cl.
  CPC ......... *F16K 31/426* (2013.01); *F16K 11/0704* (2013.01); *Y10T 137/86614* (2015.04)

(58) Field of Classification Search
  CPC ................ Y10T 137/86614; Y10T 137/87885; F16K 11/0704; F16K 31/426
  USPC ......... 137/625.64, 884; 251/66, 89, 94, 108, 251/111, 297
  See application file for complete search history.

(56) References Cited

U.S. PATENT DOCUMENTS

| 3,511,276 | A | * | 5/1970 | Jessen et al. | 137/624.27 |
| 4,079,660 | A | * | 3/1978 | Ives | 137/625.68 |
| 4,111,071 | A | * | 9/1978 | Pearce et al. | 475/127 |
| 4,324,274 | A | * | 4/1982 | Golan et al. | 137/625.68 |
| 4,716,933 | A | * | 1/1988 | Stoever et al. | 137/596.2 |
| 2008/0190228 | A1 | * | 8/2008 | Long et al. | 475/207 |
| 2012/0080633 | A1 | * | 4/2012 | Xu | 251/326 |

FOREIGN PATENT DOCUMENTS

| JP | 57-190901 U | 12/1982 |
| JP | 9-14497 A | 1/1997 |
| JP | 10-22123 | 1/1998 |

OTHER PUBLICATIONS

Office Action issued Jun. 12, 2015 in Korean Patent Application No. 10-2014-0108885 (with English language translation).

* cited by examiner

*Primary Examiner* — Craig J Price
(74) *Attorney, Agent, or Firm* — Oblon, McClelland, Maier & Neustadt, L.L.P.

(57) ABSTRACT

A detent mechanism that increases a holding force for a valve member having two switch positions includes a ring shaped housing groove and an annular elevated portion. A ring shaped detent member made of a material having rubber elasticity is housed in the housing groove. The housing groove includes right and left groove side walls which extend in parallel to each other, and a groove bottom wall. The detent member includes right and left side walls which face the groove side walls of the housing groove and a protruding portion which extends from the housing groove. A locking section which elastically locks the protruding portion of the detent member in the two switch positions is formed at both axial ends of the elevated portion.

13 Claims, 7 Drawing Sheets

DOUBLE SOLENOID VALVE WITH DETENT MECHANISM

BACKGROUND OF THE INVENTION

1. Field of the Invention

The present invention relates to double solenoid valves in which a valve member can be switched between two switch positions in a valve hole of a valve body, and more specifically to double solenoid valves with a detent mechanism in which the detent mechanism prevents the valve member from being displaced for some reasons from the switch positions, thereby stabilizing an operation of the valve member.

2. Description of the Related Art

Double solenoid valves in which a valve member having a peripheral seal element is configured to be switched between two positions in a valve hole of a valve body in the axis direction are commonly known. Since such double solenoid valves, especially those which include the valve member made from a metal seal spool, have small friction resistance between the valve member and the inner surface of the valve hole, a detent mechanism that holds the valve member in the switch positions needs to be provided in order to stabilize holding of the valve member in the switch positions.

It is not only when the valve member is made from a metal seal spool that the valve member needs to be held in the switch positions to stabilize the operation, but also, for example, when the valve has a seal member having rubber elasticity that protrudes from the periphery of the valve member so as to allow the seal member to be in frictional contact with the inner surface of the valve hole. In this case, when the solenoid is de-energized after the position of the valve member is switched to hold the position of the seal member by frictional contact with the inner surface of the valve hole, the valve member may be displaced from the switched position due to an external force of impact or the like. Accordingly, in order to prevent the valve member from being unintentionally displaced and to comply with the European safety standard (ISO 13849-1) category 1, the above detent mechanism needs to be provided.

One example of the above detent mechanism is disclosed in Patent Literature 1, Japanese Unexamined Patent Application Publication No. 10-22123. Generally, in the detent mechanism, a groove is disposed on the outer periphery of the spool or recesses having a concave spherical shape are disposed at a plurality of positions equally spaced on the outer periphery of the spool, while steel balls are disposed on the inner periphery of the valve hole at a holding position for positioning which corresponds to the groove or the recesses on the spool in a manner capable of being protruded by a pressure applied by a coil spring on the back of the steel ball so that the protruding portion of the steel ball is fit in the groove or recesses to stably hold the spool in the switch positions.

However, in the above detent mechanism, the increased number of components is necessary for mounting the detent mechanism, and in addition to that, a holding structure for the steel balls which elastically protrude to the inner surface of the valve hole needs to be provided on the valve body and the circumferential groove or the recess needs to be formed on the outer periphery of the spool, which causes the manufacture cost to be significantly increased.

SUMMARY OF INVENTION

The technical solution of the present invention is to provide a double solenoid valve which can be manufactured with a low cost by providing a detent mechanism that increases a holding force for the valve member in the switch positions to be easily assembled with a small number of components while the holding force for the valve member in the switch positions can be variously adjusted.

In order to solve the above problem, the present invention provides a double solenoid valve which includes a valve hole provided in a valve body having a plurality of ports and a valve member having two switch positions and housed in the valve hole in a manner movable in an axis direction of the valve hole, the valve member being configured to be driven by two pilot electromagnetic valves, the double solenoid valve including a detent mechanism that increases a holding force when the valve member is in the two switch positions, wherein the detent mechanism includes a ring shaped housing groove which is formed on one of an inner periphery of the valve hole and an outer periphery of the valve member and an annular elevated portion which is formed on the other, and a ring shaped detent member housed in the housing groove, the housing groove includes right and left groove side walls which extend in parallel to each other, and a groove bottom wall which connects inner bottoms of the groove side walls, the detent member is made of a material having rubber elasticity and includes right and left side walls which extend in a radius direction of the detent member and face the groove side walls of the housing groove, and a protruding portion which protrudes from the housing groove, and the elevated portion includes shoulders on both ends in the axis direction and each shoulder forms a locking section which elastically locks the protruding portion of the detent member in the two switch positions.

According to the present invention, it is preferable that the protruding portion of the detent member has a distal end formed in an arc shape, and a radius of curvature of the arc is larger than one-half of a thickness of the detent member in the axis direction.

Further, according to the present invention, it is preferable that a dimension of the cross section of the detent member in the radius direction taken at a position of the protruding portion is larger than the thickness of the detent member in the axis direction.

Further, according to a preferable configuration of the present invention, a gap is formed between the housing groove and the detent member so as to absorb deformation of the detent member when the detent member rides on the elevated portion.

According to one specific configuration example of the present invention, the housing groove is formed on the inner periphery of the valve hole and the elevated portion is formed on the outer periphery of the valve member.

In this case, it is possible that a gap is formed between the groove bottom wall of the housing groove and the outer peripheral wall of the detent member so that the detent member is extensible in the radius direction when the protruding portion of the detent member rides on the elevated portion and the holding force for the valve member is increased by an extension force.

Alternatively, it is possible that the detent member includes the protruding portions at a plurality of positions in the circumferential direction, and the holding force for the valve member by the detent member is adjustable depending on the sum of the length of the protruding portions in the circumferential direction and the strength of the contact pressure of the protruding portions.

Further, it is possible that the entire outer peripheral wall of the detent member is brought into contact with the groove bottom wall of the housing groove and the detent member includes the protruding portion disposed on the entire inner periphery, a plurality of ribs which extends in the radial direction is formed on the side wall of the detent member so as to be in contact with the groove side wall of the housing groove, and a space formed by the adjacent ribs between the side wall of the detent member and the groove side wall of the housing groove serves as a space that absorbs the increase in thickness of the detent member due to compression of the detent member in the radius direction when the protruding portion of the detent member rides on the elevated portion.

Further, it is possible that an adapter plate which includes an extension portion of the valve hole is connected to one end of the valve body, and the housing groove is formed at a contact position of the adapter plate and the valve body by cutting a portion of at least one of contact surfaces of the adapter plate and the valve body.

According to another specific configuration example, the housing groove is formed on the outer periphery of the valve member and the elevated portion is formed on the inner periphery of the valve hole.

In this case, the detent member includes the protruding portions at a plurality of positions in the circumferential direction, and the holding force for the valve member by the detent member is adjustable depending on the sum of the length of the protruding portions in the circumferential direction and the strength of the contact pressure of the protruding portions.

Alternatively, it is possible that the entire inner periphery of the detent member is brought into contact with the groove bottom wall of the housing groove and the detent member includes the protruding portion disposed on the entire outer periphery, a plurality of ribs which extends in the radial direction is formed on the side wall of the detent member so as to be in contact with the groove side wall of the housing groove, and a space formed by the adjacent ribs between the side wall of the detent member and the groove side wall of the housing groove serves as a space that absorbs the increase in thickness of the detent member due to compression of the detent member in the radius direction when the protruding portion of the detent member rides on the elevated portion.

Further, it is possible that an adapter plate which includes an extension portion of the valve hole is connected to one end of the valve body, and the elevated portion is formed on the extension portion of the adapter plate.

According to the above described double solenoid valve of the present invention, the detent mechanism to the valve member is configured to be easily assembled with a small number of components, thereby reducing the manufacturing cost, and the holding force for the valve member in the switch positions can be variously adjusted.

DETAILED DESCRIPTION OF THE INVENTION

Figure 1:
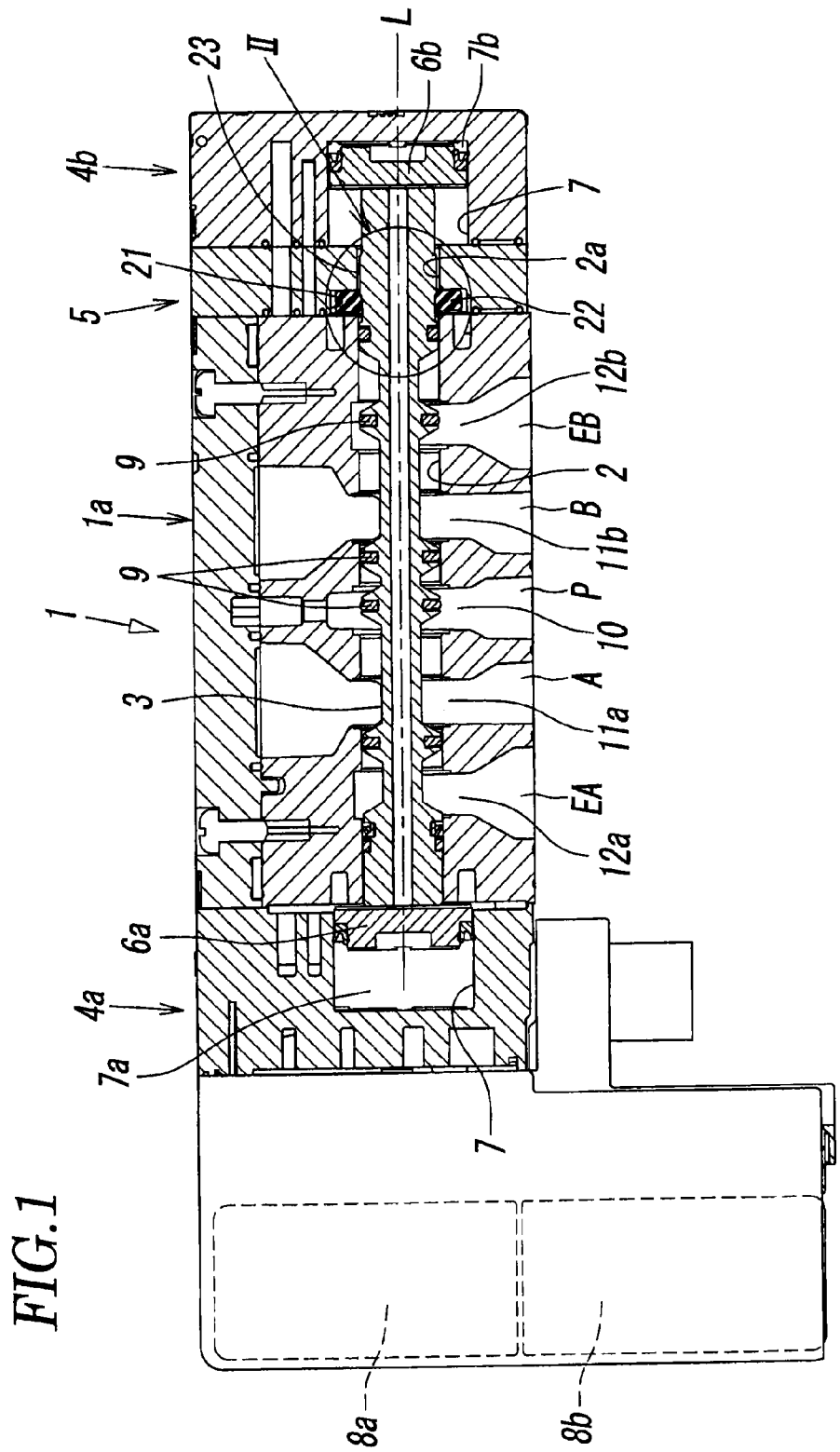
FIG. 1 is a partial cross sectional view which shows an overall configuration of the first embodiment of a double solenoid valve according to the present invention.

FIG. 1 shows an overall configuration of the first embodiment of a double solenoid valve with a detent mechanism according to the present invention. The double solenoid valve includes a valve body 1 which is formed of a combination of a main body 1a, adapter blocks 4a, 4b, and an adapter plate 5. A valve hole 2 is disposed in the valve body 1 so as to penetrate the main body 1a and the adapter plate 5. The valve hole 2 communicates with a supply flow passage 10 which is connected to a supply port P formed on the main body 1a. The valve hole 2 also communicates with two output flow passages 11a, 11b which are respectively connected to two output ports A, B formed on the main body 1a at positions on the opposite sides of the supply flow passage 10. Further, the valve hole 2 also communicates with two exhaust flow passages 12a, 12b which are respectively connected to two exhaust ports EA, EB formed on the main body 1a at positions on the sides of the ends of the valve hole with respect to the output flow passages 11a, 11b. In addition, a valve member 3 that switches the communication states of the respective flow passages is inserted into the valve hole 2 so as to be slidably movable in an axis L direction.

The valve member 3 is configured to switch between two switch positions, that is, a first switch position (FIG. 1) which allows the supply flow passage 10 which is connected to the supply port P to communicate with the first output flow passage 11a and the second output flow passage 11b to communicate with the adjacent second exhaust flow passage 12b, and a second switch position (FIG. 8) which allows the supply flow passage 10 to communicate with the second output flow passage 11b and the first output flow passage 11a to communicate with the adjacent first exhaust flow passage 12a. The valve member 3 is provided with a drive mechanism that switches the valve member 3 between the two positions.

In order to form the above drive mechanism, a first adapter block 4a is connected to one end of the main body 1a in the axis L direction, and a second adapter block 4b is connected to the other end of the main body 1a in the axis L direction via the adapter plate 5, and two pistons 6a, 6b are slidably housed in piston chambers 7 which are formed in the respective adapter blocks 4a, 4b so that the pistons 6a, 6b abut against the ends of the valve member 3 to drive the valve member 3 to the two switch positions.

The pressure chambers 7a, 7b are defined in the respective piston chambers 7 on a pressure receiving surface side of the pistons 6a, 6b, respectively, on the opposite side to an abutment surface that abuts against the end of the valve member 3. Each of the pressure chambers 7a, 7b communicate with pilot output ports (not shown in the figure) of a pair of known pilot electromagnetic valves 8a, 8b which are connected to one end of the above 5-port solenoid valve.

When the first pilot electromagnetic valve 8a is energized, a pilot air from the pilot output port is introduced into the first pressure chamber 7a through a passage (not shown in the figure) in the first adapter block 4a. Meanwhile, when the second pilot electromagnetic valve 8b is not energized, the second pressure chamber 7b is open to the atmosphere via the second pilot electromagnetic valve 8b, and accordingly, the pilot air from the first pilot electromagnetic valve 8a applies pressure to the valve member 3 via the first piston 6a so that the valve member 3 is driven to the first switch position at the right end as shown in FIG. 1. As a result, the supply flow passage 10 which is connected to the supply port P is opened to the first output flow passage 11a which is connected to the first output port A, thereby allowing the air to be supplied to a hydraulic circuit which is connected to the first output port A.

Further, when the first pilot electromagnetic valve 8a is de-energized and the second pilot electromagnetic valve 8b is energized, the first output flow passage 11a communicates with the first exhaust flow passage 12a, and the pressure air in the hydraulic circuit which is connected to the first output port A is exhausted while the pilot air from the pilot output port of the second pilot electromagnetic valve 8b is introduced into the second pressure chamber 7b through passages (not shown in the figure) in the first adapter block 4a, the main body 1a, the adapter plate 5 and the second adapter block 4b, and applies pressure to the valve member 3 via the second piston 6b. Accordingly, the valve member 3 moves to the left from the switch position shown in FIG. 1 and is driven to the second switch position (see FIG. 8). As a result, the supply flow passage 10 which is connected to the supply port P is opened to the second output flow passage 11b which is connected to the second output port B, thereby allowing the pressure air to be supplied to the hydraulic circuit which is connected to the second output port B.

As mentioned above, in the double solenoid valve having the above-described basic configuration, even in the case where a seal member 9 having rubber elasticity protrudes from the outer periphery of the valve member 3 shown in the figure so as to be in frictional contact with the inner surface of the valve hole, holding of the valve member 3 in the two switch positions is not always stable in the state in which the pilot electromagnetic valves 8a, 8b are not energized. Accordingly, in order to prevent the valve member 3 from being unintentionally displaced, it is preferable to provide a detent mechanism that increases a holding force for the valve member 3 in the two switch positions in the double solenoid valve.

According to the present invention, a double solenoid valve having the basic configuration as shown in FIG. 1, that is, a double solenoid valve in which the valve member 3 can be switched between two positions in the axis L direction in the valve hole 2 which penetrates through the valve body 1 so as to switch the flow passage can be manufactured with a low cost by providing a detent mechanism, which is provided in the case where holding of the valve member 3 in the two switch positions is not stable, to be easily assembled with a small number of components while the holding force for the valve member in the switch positions can be variously adjusted. In the following description, configuration examples of the detent mechanisms 20A-20C which are disposed between the valve hole 2 and the valve member 3 in the double solenoid valve having the configuration shown in FIG. 1 will be described in detail with reference to FIGS. 2 to 7.

Figure 2:
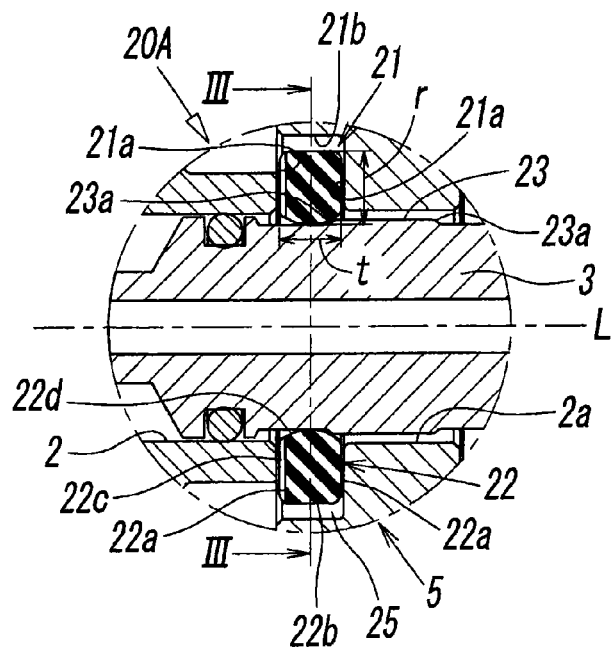
FIG. 2 is an enlarged view of an essential part (area II of FIG. 1) of the first embodiment.
Figure 3:
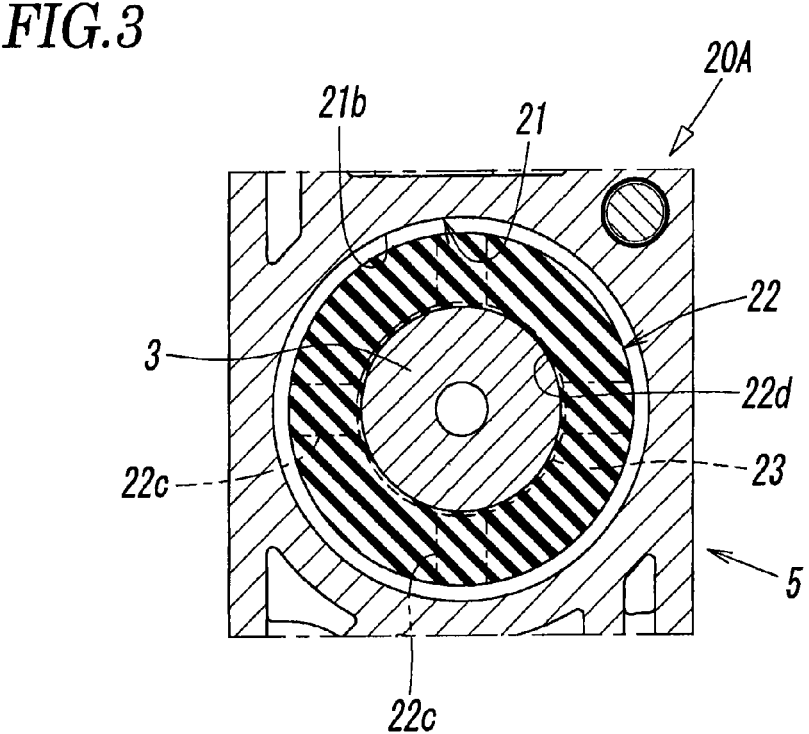
FIG. 3 is a cross sectional view taken along the line III-III of FIG. 2.
Figure 4:
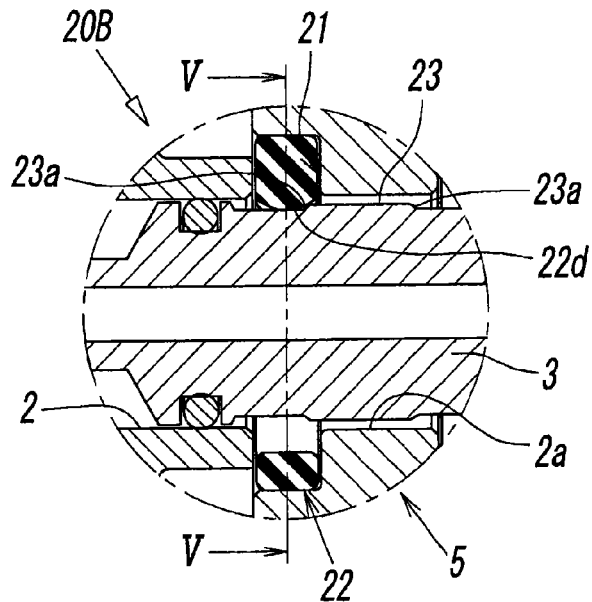
FIG. 4 is an enlarged cross sectional view, taken at a position similar to that of FIG. 2, which shows an essential part of the second embodiment of the double solenoid valve according to the present invention.
Figure 5:
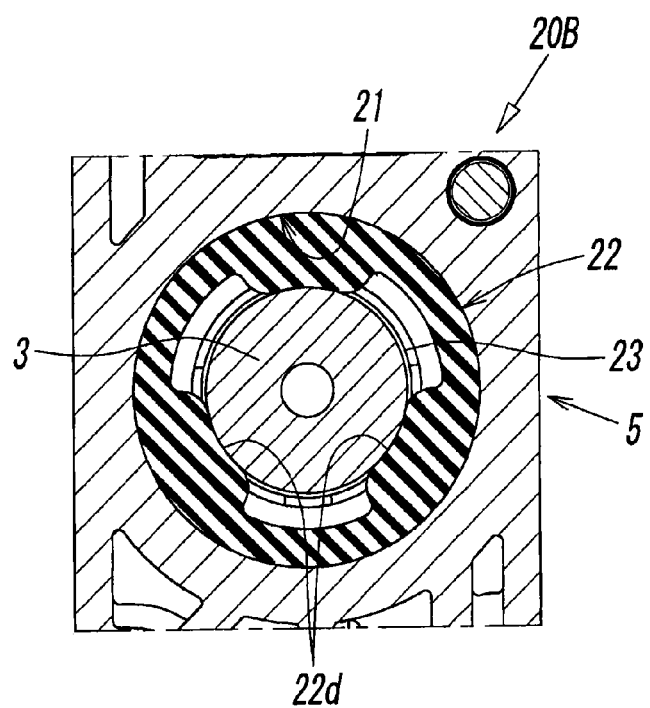
FIG. 5 is a cross sectional view taken along the line V-V of FIG. 4.
Figure 6:
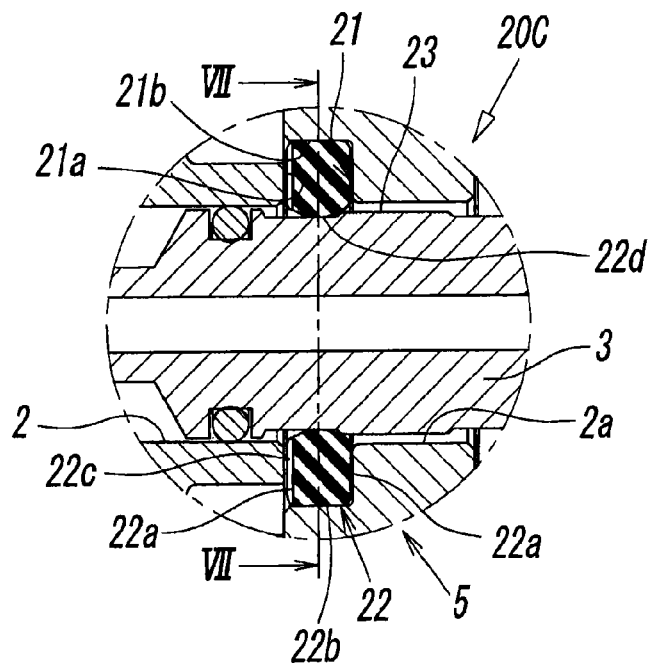
FIG. 6 is an enlarged cross sectional view, taken at a position similar to that of FIG. 2, which shows an essential part of the third embodiment of the double solenoid valve according to the present invention.
Figure 7:
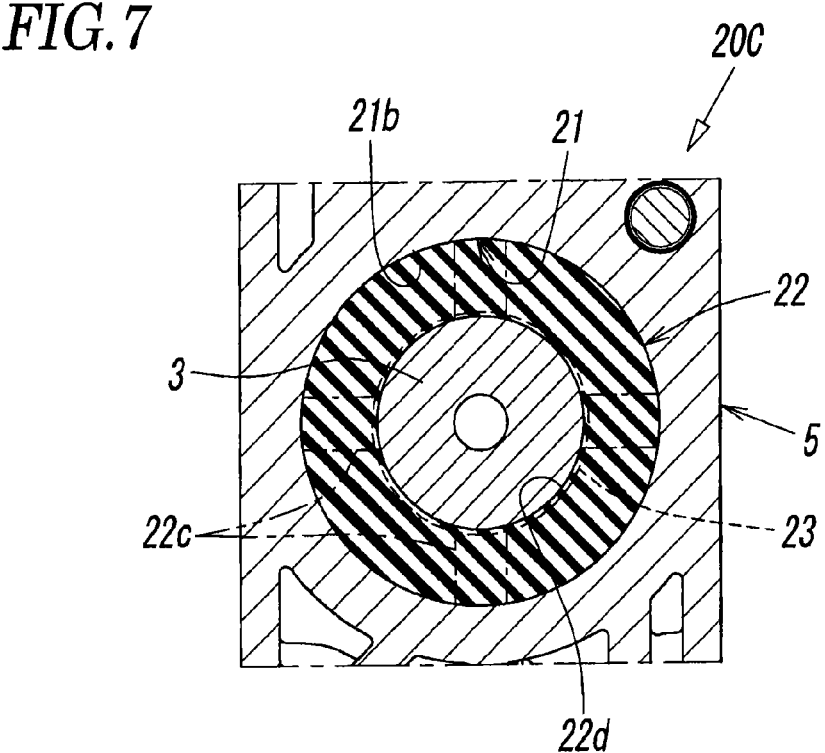
FIG. 7 is a cross sectional view taken along the line VII-VII of FIG. 6.

First, FIG. 2 is an enlarged view of a configuration of the area II of the double solenoid valve of FIG. 1 and shows the detent mechanism 20A of the first embodiment. FIG. 3 shows a cross sectional shape taken along the line of FIG. 2. Further, FIGS. 4 and 6 show essential parts of the detent mechanisms 20B, 20C of the second and third embodiments, respectively, which are used instead of the configuration of the area II of the double solenoid valve of FIG. 1. FIG. 5 is a cross sectional view taken along the line V-V of FIG. 4, and FIG. 7 is a cross sectional view taken along the line VII-VII of FIG. 6.

The detent mechanisms 20A-20C of the first to third embodiments have the same configuration in which a ring-shaped housing groove 21 is disposed on the inner peripheral surface of the valve hole 2, a ring-shaped detent member 22 made of a material having rubber elasticity is housed in the housing groove 21, an annular elevated portion 23 is disposed on the outer peripheral surface of the valve member 3 so that the detent member 22 rides on the elevated portion 23 when the valve member 3 moves between the two switch positions, and shoulders on both ends of the elevated portion 23 in the axis L direction are provided as locking sections 23a which lock a protruding portion 22d of the detent member 22 in the two switch positions. Further, movement of the valve member 3 in a direction in which the locking section 23a of the elevated portion 23 is away from the protruding portion 22d of the detent member 22 is limited by the ends of the valve member 3 abutting against the respective pistons 6a, 6b, respectively.

The housing groove 21 that houses the detent member 22 includes right and left groove side walls 21a formed as flat surfaces which extend in the depth direction and in parallel to each other and a flat groove bottom wall 21b which connects inner bottoms of the right and left groove side walls 21a. Further, the detent member 22 includes right and left side walls 22a which extend linearly in a radius direction of the detent member 22 and in parallel to each other so as to face the right and left groove side walls 21a of the housing groove 21, respectively, an annular outer peripheral wall 22b which is flat in the axis L direction, and the protruding portion 22d which protrudes from the housing groove 21. The detent member 22 keeps its position stable by allowing the entire side walls 22a to be in contact with the groove side walls 21a, or alternatively, by allowing a plurality of ribs 22c formed on part of the side walls 22a so as to extend in a radial direction to be in contact with the groove side walls 21a.

In addition, the elevated portion 23 is formed in a cylindrical shape having a uniform diameter, and portions on both sides of the elevated portion 23 of the valve member 3 have a diameter smaller than that of the elevated portion 23 such that the locking sections 23a are formed as an inclined surface between the small-diameter portions and the elevated portion 23.

When the detent member has a circular cross sectional shape like an O ring for sealing, the stop position of the valve member 3 may become unstable since the detent member is easily rotated or deformed by being in pressing contact with the shoulders of the elevated portion 23 of the valve member 3. However, the position of the detent member 22 or the stop position of the valve member 3 can be stabilized during a stop operation of the valve member 3 by providing the detent member 22 having a pair of side walls 22a as described above. In addition, the cross sectional shape of the protruding portion 22d of the detent member 22 is preferably an arc shape as shown in FIGS. 2, 4 and 6. Although this shape contributes to accurately stabilize the stop position of the valve member 3, any shape other than arc shape may be used so as to correspond to the shape of the shoulders of the elevated portion 23 of the valve member 3.

When the protruding portion 22d has a distal end formed in an arc shape, a radius of curvature of the arc is preferably larger than one-half of the thickness t of the detent member 22 in the axis L direction. Further, a dimension r of the cross section of the detent member 22 in the radius direction taken at a position of the protruding portion 22d is preferably larger than the thickness t.

In the double solenoid valve, the adapter plate 5 which includes an extension portion 2a of the valve hole 2 is disposed as part of the valve body 1 between the main body 1a and the second adapter block 4b. This configuration facilitates processing of the housing groove 21 and assembly of the detent member 22 to the housing groove 21. In the illustrated example, the housing groove 21 is formed by cutting a portion of a contact surface of the adapter plate 5 which is in contact with the main body 1a at a position between the main body 1a and the adapter plate 5 which is connected to one end of the main body 1a in the axis L direction. However, the housing groove 21 may also be formed by cutting a portion of the side face of the main body 1a, or alternatively, by cutting both contact surfaces of the main body 1a and the adapter plate 5. Further, the adapter plate 5 may not be provided when processing of the housing groove 21 to the valve body 1 and assembly of the detent member 22 to the housing groove 21 can be easily performed.

Next, configurations specific to each of the detent mechanisms 20A-20C will be individually described.

First, in the detent mechanism 20A of the first embodiment shown in FIGS. 2 and 3, an annular gap 25 in a substantially constant size is formed between the outer peripheral wall 22b of the detent member 22 housed in the housing groove 21 and the groove bottom wall 21b of the housing groove 21. When the protruding portion 22d of the detent member 22 rides on the elevated portion 23 during a switch operation of the valve member 3, the detent member 22 is elastically extensible in the radius direction, unlike the detent mechanism 20C of the third embodiment which is compressed by the groove bottom wall 21b and the elevated portion 23 as described later. Accordingly, the holding force for the valve member 3 is adjustable by the extension force. The detent mechanism 20A of the first embodiment is suitable for the case where the holding force for the valve member 3 may be relatively low, and has a simple and inexpensive configuration and excellent assembly ability.

Further, in the detent mechanism 20B of the second embodiment shown in FIGS. 4 and 5, the detent member 22 housed in the housing groove 21 includes the protruding portions 22d which protrudes from the housing groove 21 at a plurality of positions with a constant interval in the circumferential direction. The protruding portion 22d is configured to ride on the elevated portion 23 of the valve member 3 and is locked with the elevated portion 23 in the first and second switch positions during a switch operation of the flow passage. The holding force for the valve member 3 by the detent member 22 is adjustable depending on the sum of the length of the protruding portions 22d, the extent of distribution of the protruding portions 22d, the strength of the contact pressure applied when the protruding portions 22d ride on the elevated portion 23 and the like. In this case, the gap between the adjacent protruding portions 22d serves as a gap that absorbs deformation due to compression of the detent member 22.

Further, in the detent mechanism 20C of the third embodiment shown in FIGS. 6 and 7, the outer peripheral wall 22b of the detent member 22 housed in the housing groove 21 are configured to come into contact with the groove bottom wall 21b of the housing groove 21 and the protruding portion 22d which protrudes from the housing groove 21 is formed on the entire circumference of the detent member 22 to be locked with and ride on the elevated portion 23 of the valve member 3. Further, a plurality of ribs 22c which extends in the radial direction is formed on the side walls 22a of the detent member 22 so as to be in contact with the groove side walls 21a of the housing groove 21. Spaces formed by the adjacent ribs 22c between the side walls 22a of the detent member 22 and the groove side walls 21a of the housing groove 21 serve as spaces that absorb the increase in thickness of the detent member due to compression of the detent member 22 in the radius direction when the protruding portion 22d of the detent member 22 rides on the elevated portion 23.

In the detent mechanism 20C, when the protruding portion 22d of the detent member 22 rides on the elevated portion 23 and the detent member 22 is compressed in the radius direction, the spaces between the ribs 22c absorb the increase in thickness of the detent member 22. Accordingly, the holding force for the valve member 3 by the detent member 22 is effectively improved.

Figure 8:
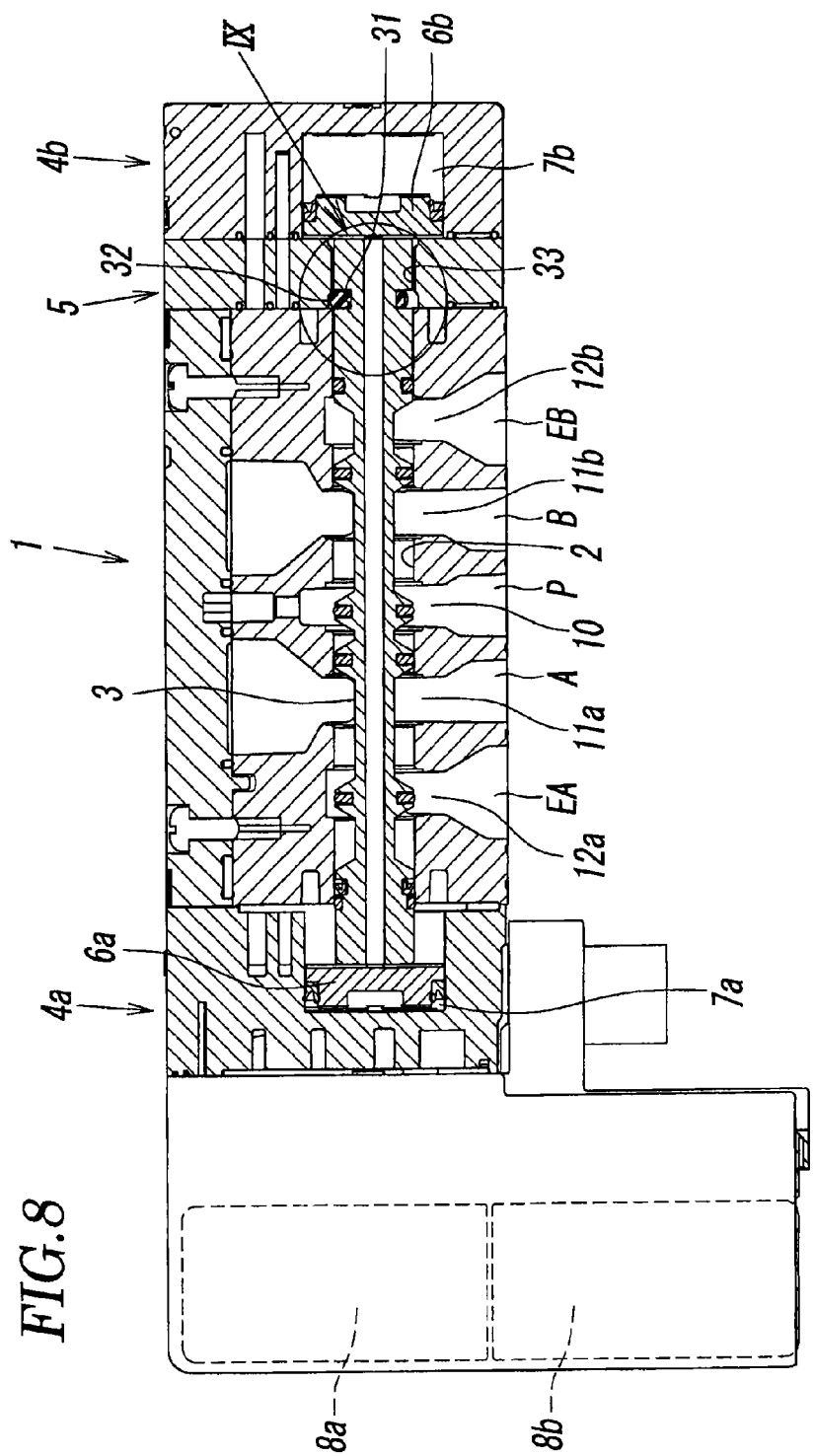
FIG. 8 is a partial cross sectional view which shows an overall configuration of the fourth embodiment of the double solenoid valve according to the present invention.

FIG. 8 shows an overall configuration of the fourth embodiment of the double solenoid valve according to the present invention. As described above, in the detent mechanisms 20A-20C of the double solenoid valve of the first to third embodiments, the housing groove 21 is disposed on the inner peripheral surface of the valve hole 2 so that the detent member 22 is housed in the housing groove 21, while the elevated portion 23 is disposed on the outer peripheral surface of the valve member 3 so that the shoulders on both ends of the elevated portion 23 are provided as the locking sections 23a which lock the protruding portion 22d of the detent member 22. On the other hand, in the detent mechanism 20D of the double solenoid valve of the fourth embodiment shown in FIG. 8, a housing groove 31 is disposed on the outer peripheral surface of the valve member 3 so that a detent member 32 is housed in the housing groove 31, while an elevated portion 33 is disposed on the inner peripheral surface of the valve hole 2 so that the shoulders on both ends of the elevated portion 33 are provided as locking sections 33a which lock a protruding portion 32d of the detent member 32.

Since the basic configuration of the double solenoid valve of FIG. 8 is substantially the same as that of the double solenoid valve of FIG. 1 except for the detent mechanism 20D, the same reference numbers are assigned to the same and corresponding elements in FIG. 8 as those of the double solenoid valve of FIG. 1, and the explanation of the basic configuration is omitted. Further, the configuration of the detent mechanism 20D is also substantially the same as that of the detent mechanisms 20A to 20C used in the double solenoid valve of FIG. 1, which is described above, except for positioning of the housing groove and the elevated portion being modified. Therefore, the specific description is omitted, and the detent mechanism 20D of the fourth embodiment will be briefly described with reference to FIGS. 9 and 10, and the detent mechanism 20E of the fifth embodiment will be briefly described with reference to FIGS. 11 and 12.

Figure 9:
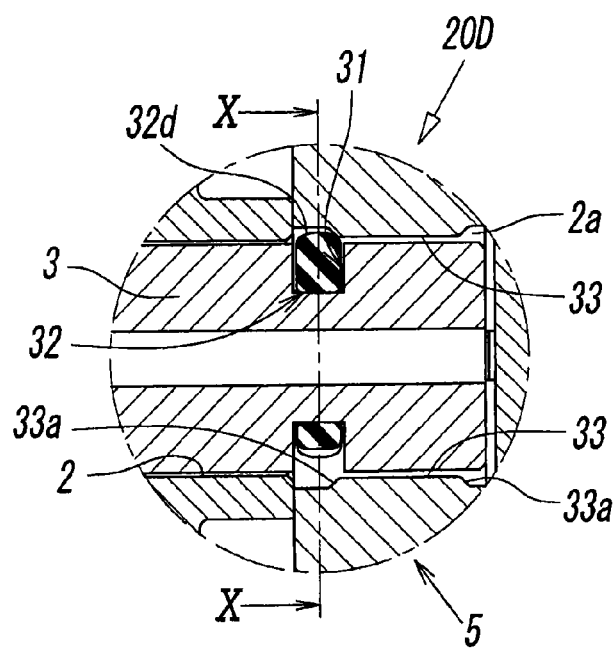
FIG. 9 is an enlarged view of an essential part (area IX of FIG. 8) of the fourth embodiment.
Figure 10:
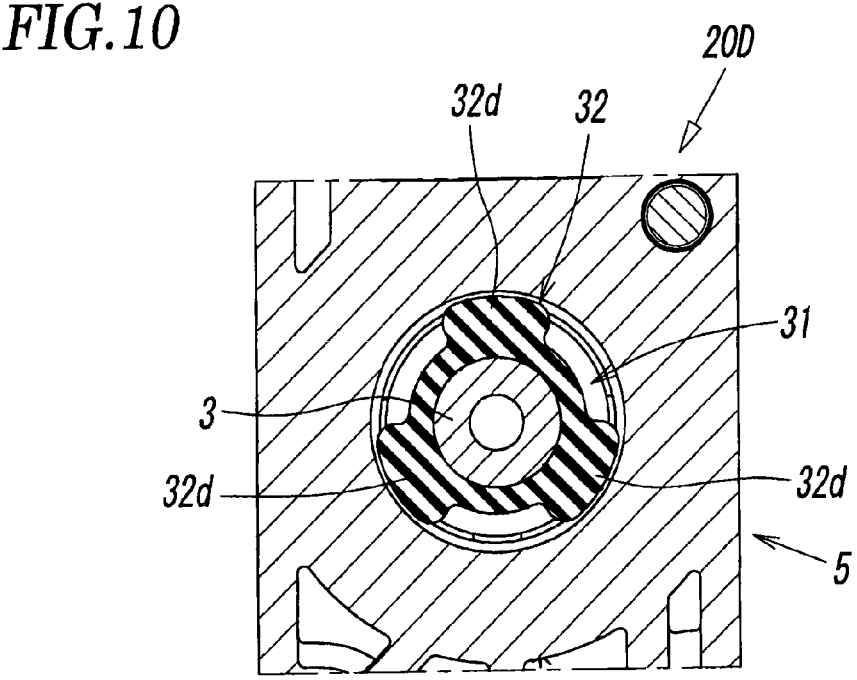
FIG. 10 is a cross sectional view taken along the line X-X of FIG. 9.

First, in the detent mechanism 20D of the fourth embodiment shown in FIGS. 9 and 10, the housing groove 31 is formed on the valve member 3, and the elevated portion 33 is formed on the inner peripheral surface of the extension portion 2a of the valve hole 2 in the adapter plate 5 which is connected to one end of the main body 1a in the axis L direction. The protruding portions 32d which protrude from the housing groove 31 are disposed on the outer periphery of the detent member 32 which is housed in the housing groove 31 at a plurality of positions with a constant interval, and the locking sections 33a which lock the protruding portions 32d in the two switch positions of the valve member 3 are disposed on the shoulders on both ends of the elevated portion 33. The holding force for the valve member 3 by the detent member 32 in the switch positions is adjustable depending on the sum of the length of the protruding portions 32d, the strength of the contact pressure of the protruding portions 32d and the like.

Figure 11:
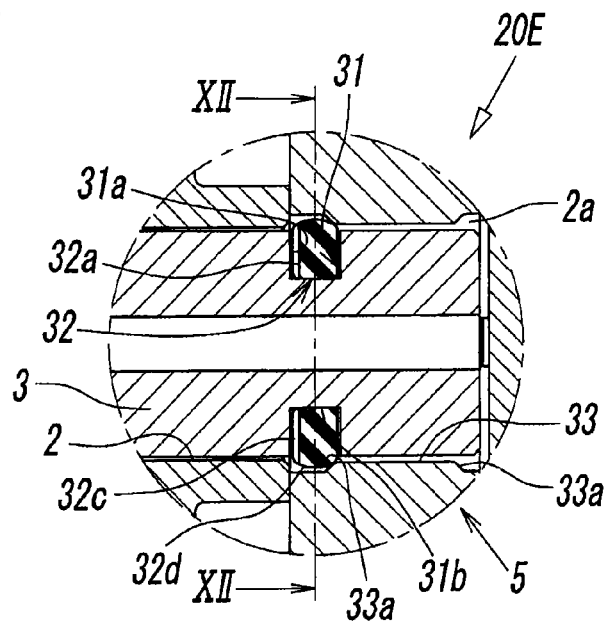
FIG. 11 is an enlarged cross sectional view, taken at a position similar to that of FIG. 9, which shows an essential part of the fifth embodiment of the double solenoid valve according to the present invention.
Figure 12:
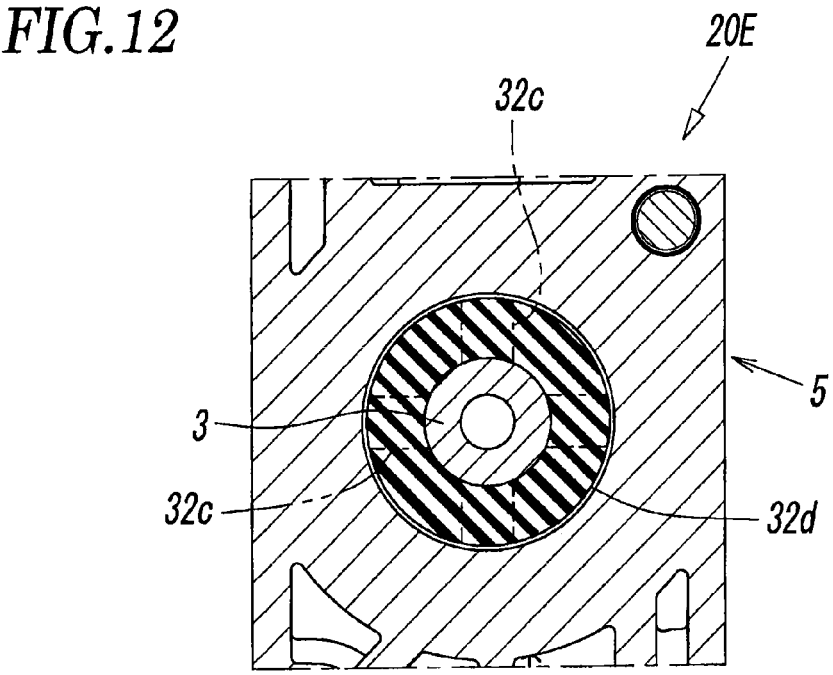
FIG. 12 is a cross sectional view taken along the line XII-XII of FIG. 11.

Further, in the detent mechanism 20E of the fifth embodiment shown in FIGS. 11 and 12, the housing groove 31 is formed on the valve member 3, and the elevated portion 33 is formed on the inner peripheral surface of the extension portion 2a of the valve hole 2 in the adapter plate 5 which is connected to one end of the main body 1a in the axis L direction. The entire inner peripheral wall of the detent member 32 housed in the housing groove 31 is in contact with the groove bottom wall 31b of the housing groove 31. Further, the protruding portion 32d which protrudes from the housing groove 31 is formed on the entire periphery of the detent member 32, and the locking sections 33a are formed on the shoulders on both ends of the elevated portion 33 so that the protruding portion 32d are locked with the locking sections 33a in the two switch positions of the valve member 3. Further, a plurality of ribs 32c which extends in the radial direction is formed on the side walls 32a of the detent member 32 so as to be in contact with the groove side walls 31a of the housing groove 31. Spaces between the adjacent ribs 32c are formed between the side walls 32a of the detent member 32 and the groove side walls 31a of the housing groove 31, which serve as spaces that absorb the increase in thickness of the detent member 32 due to compression of the detent member 32 in the radius direction when the protruding portion 32d rides on the elevated portion 33 during a switch operation of the valve member 3.

The invention claimed is:

1. A double solenoid valve with a detent mechanism, the double solenoid valve including a valve hole provided in a valve body having a plurality of ports; and a valve member having two switch positions and housed in the valve hole in a manner movable in an axis direction of the valve hole, the valve member being configured to be driven by two pilot electromagnetic valves, wherein the double solenoid valve comprises the detent mechanism for increasing a holding force when the valve member is in the two switch positions, the detent mechanism includes a ring shaped housing groove which is formed on one of an inner periphery of the valve hole and an outer periphery of the valve member and an annular elevated portion which is formed on the other of the inner periphery of the valve hole and the outer periphery of the valve member, and a ring shaped detent member housed in the housing groove, the housing groove includes right and left groove side walls which extend in parallel to each other, and a groove bottom wall which connects inner bottoms of the groove side walls, the detent member is made of a material having rubber elasticity and includes right and left side walls which extend in a radius direction of the detent member and face the groove side walls of the housing groove, and a protruding portion which protrudes from the housing groove, and the elevated portion includes shoulders on both ends in the axis direction and each shoulder forms a locking section which elastically locks the protruding portion of the detent member in the two switch positions.

2. The double solenoid valve according to claim 1, wherein the protruding portion of the detent member has a distal end formed in an arc shape, and a radius of curvature of the arc is larger than one-half of a thickness of the detent member in the axis direction.

3. The double solenoid valve according to claim 1, wherein a dimension of a cross section of the detent member in the radius direction taken at a position of the protruding portion is larger than a thickness of the detent member in the axis direction.

4. The double solenoid valve according to claim 1, wherein a gap is formed between the housing groove and the detent member so as to absorb deformation of the detent member when the detent member rides on the elevated portion.

5. The double solenoid valve according to claim 1, wherein the housing groove is formed on the inner periphery of the valve hole and the elevated portion is formed on the outer periphery of the valve member.

6. The double solenoid valve according to claim 5, wherein a gap is formed between the groove bottom wall of the housing groove and an outer peripheral wall of the detent member so that the detent member is extensible in the radius direction when the protruding portion of the detent member rides on the elevated portion and the holding force for the valve member is increased by an extension force.

7. The double solenoid valve according to claim 5, wherein the detent member includes a plurality of the protruding portions at a plurality of positions in a circumferential direction, and a holding force for the valve member by the detent member is adjustable depending on a sum of a length of the protruding portions in the circumferential direction and a strength of a contact pressure of the protruding portions.

8. The double solenoid valve according to claim 5, wherein an entirety of an outer peripheral wall of the detent member is in contact with the groove bottom wall of the housing groove and the detent member includes the protruding portion disposed on an entirety of an inner periphery, a plurality of ribs which extends in the radius direction is formed on one of the side walls of the detent member so as to be in contact with the groove side wall of the housing groove, and a space formed by adjacent ribs between the one side wall of the detent member and the groove side wall of the housing groove serves as a space that absorbs an increase in thickness of the detent member due to compression of the detent member in the radius direction when the protruding portion of the detent member rides on the elevated portion.

9. The double solenoid valve according to claim 5, wherein an adapter plate which includes an extension portion of the valve hole is connected to one end of the valve body, and the housing groove is formed at a contact position of the adapter plate and the valve body by cutting a portion of at least one of contact surfaces of the adapter plate and the valve body.

10. The double solenoid valve according to claim 1, wherein the housing groove is formed on the outer periphery of the valve member and the elevated portion is formed on the inner periphery of the valve hole.

11. The double solenoid valve according to claim 10, wherein the detent member includes a plurality of the protruding portions at a plurality of positions in a circumferential direction, and a holding force for the valve member by the detent member is adjustable depending on a sum of a length of the protruding portions in the circumferential direction and a strength of a contact pressure of the protruding portions.

12. The double solenoid valve according to claim 10, wherein an entirety of an inner periphery of the detent member is in contact with the groove bottom wall of the housing groove and the detent member includes the protruding portion disposed on an entirety of an outer periphery, a plurality of ribs which extends in the radius direction is formed on one of the side walls of the detent member so as to be in contact with the groove side wall of the housing groove, and a space formed by adjacent ribs between the one side wall of the detent member and the groove side wall of the housing groove serves as a space that absorbs an increase in thickness of the detent member due to compression of the detent member in the radius direction when the protruding portion of the detent member rides on the elevated portion.

13. The double solenoid valve according to claim 10, wherein an adapter plate which includes an extension portion of the valve hole is connected to one end of the valve body, and the elevated portion is formed on the extension portion of the adapter plate.

* * * * *